United States Patent
Kao et al.

(10) Patent No.: US 12,319,793 B2
(45) Date of Patent: Jun. 3, 2025

(54) METHOD OF MANUFACTURING RESIN COMPOSITION

(71) Applicant: FORMOSA PLASTICS CORPORATION, Kaohsiung (TW)

(72) Inventors: Tang-Chun Kao, Kaohsiung (TW); Yu-Cheng Hsu, Kaohsiung (TW); Kai-Cheng Yen, Kaohsiung (TW); Chien-Hsu Chou, Kaohsiung (TW); Chih-Hsuan Ou, Kaohsiung (TW); Han-Chang Wu, Kaohsiung (TW); Long-Tyan Hwang, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 336 days.

(21) Appl. No.: 17/882,262

(22) Filed: Aug. 5, 2022

(65) Prior Publication Data
US 2023/0053279 A1 Feb. 16, 2023

(30) Foreign Application Priority Data
Aug. 5, 2021 (TW) .................. 110128998

(51) Int. Cl.
C08J 3/21 (2006.01)
C08K 3/22 (2006.01)
C08K 3/36 (2006.01)

(52) U.S. Cl.
CPC ................. *C08J 3/212* (2013.01); *C08K 3/22* (2013.01); *C08K 3/36* (2013.01); *C08J 2363/00* (2013.01);
(Continued)

(58) Field of Classification Search
CPC ... C08J 3/212; C08K 3/22; C08K 3/36; C08K 2003/2244; C08K 2201/005; C08K 2201/011; C08K 2201/014
See application file for complete search history.

(56) References Cited

U.S. PATENT DOCUMENTS

| 6,284,035 B1 | 9/2001 | Reisacher et al. |
| 2010/0244286 A1 | 9/2010 | Lagsa |
| 2015/0069294 A1 | 3/2015 | Al-Qadhi et al. |

FOREIGN PATENT DOCUMENTS

| CN | 103865234 A | 6/2014 |
| CN | 104327456 A | 2/2015 |

(Continued)

OTHER PUBLICATIONS

English Machine Translation of JPH1133377 (A) obtained on Sep. 3, 2024 from https://worldwide.espacenet.com/publication Details/biblio?CC=JP&NR=H1133377A&KC=A&FT=D&ND=3&date=19990209&DB=EPODOC&locale=en_EP (Year: 1999).*

(Continued)

*Primary Examiner* — Catherine S Branch
*Assistant Examiner* — Olga Lucia Donahue
(74) *Attorney, Agent, or Firm* — MUNCY, GEISSLER, OLDS & LOWE, P.C.

(57) ABSTRACT

A method of manufacturing resin composition includes following operations. A nano-particle filler, a micro-inorganic particle, and a resin are stirred and mixed to form a mixture. The mixture is centrifuged at a high speed to form an upper layer mixing liquid and a lower layer mixing liquid. The upper layer mixing liquid is taken out and obtains the resin composition.

17 Claims, 1 Drawing Sheet

(52) U.S. Cl.
     CPC ............... *C08K 2003/2244* (2013.01); *C08K 2201/005* (2013.01); *C08K 2201/011* (2013.01); *C08K 2201/014* (2013.01)

(56) References Cited

FOREIGN PATENT DOCUMENTS

| | | | |
|---|---|---|---|
| CN | 104479294 | A | 4/2015 |
| CN | 105542399 | A | 5/2016 |
| CN | 107418360 | A | 12/2017 |
| CN | 108678590 | A | 10/2018 |
| CN | 110041662 | A | 7/2019 |
| CN | 111777840 | A | 10/2020 |
| CN | 112250996 | A | 1/2021 |
| CN | 113088162 | A | 7/2021 |
| JP | H11-33377 | A | 2/1999 |
| JP | 2000-086931 | A | 3/2000 |
| JP | 2009013227 | A | 1/2009 |
| JP | 2010-189628 | A | 9/2010 |
| JP | 2021-170636 | A | 10/2021 |
| KR | 100909106 | B1 | 7/2009 |
| TW | 200708610 | A | 3/2007 |
| WO | WO2006/080318 | A1 | 8/2006 |
| WO | WO 2010041968 | A2 | 4/2010 |

OTHER PUBLICATIONS https://worldwide.espacenet.com/publication Details/biblio?CC=CN&NR=105542399A&KC=A&FT=D&ND=3&date=20160504&DB=&locale=en_EP (Year: 2016).*

Database WPI Week 201007, Thomson Scientific, London, GB; AN 2009-M29593, XP002808343, 2017, 2 pages.

* cited by examiner

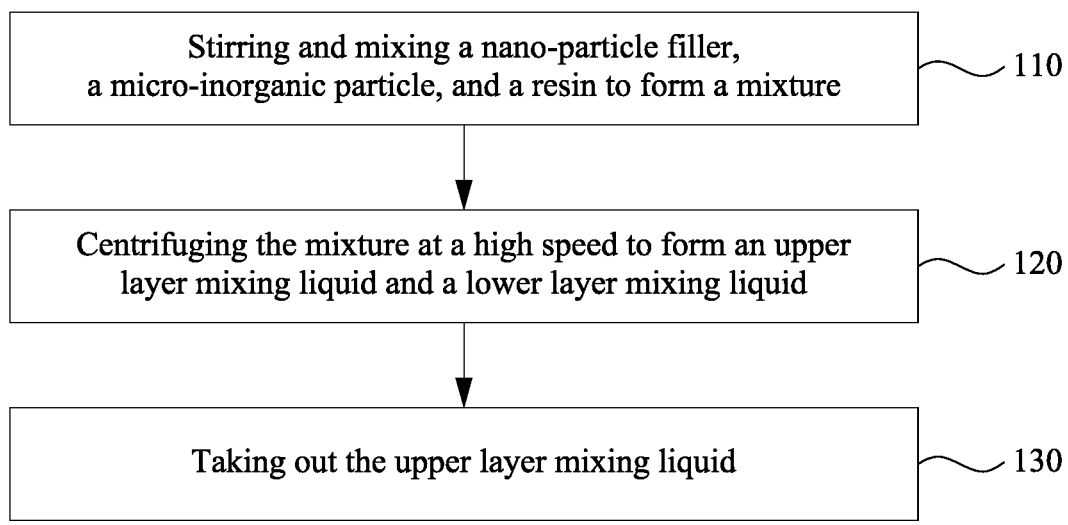

METHOD OF MANUFACTURING RESIN COMPOSITION

CROSS-REFERENCE TO RELATED APPLICATION

This application claims priority to Taiwan Application Serial Number 110128998, filed Aug. 5, 2021, which is herein incorporated by reference in its entirety.

BACKGROUND

Field of Invention

The present disclosure relates to a method of manufacturing resin composition.

Description of Related Art

High-performance resin composition is widely used in adhesives, electronic instruments, aerospace, coatings, electrical and electronic insulation materials, and advanced composite materials. After curing, the high-performance resin composition forms a three-dimensional structure with high crosslinking density, which can significantly improve the strength, rigidity, modulus, hardness, and heat resistance of the resin material. However, because of the nature of the material, high crosslinking density will also make the material brittle. Therefore, it is easy to cause fracture under the force in use, thus limiting the application. One of the methods to increase the toughness is to introduce nanoparticles with specific modified functions on the surface of the nanoparticles.

However, because of the high surface energy characteristic of the nanoparticles, they aggregate easily. It causes difficulty to uniformly disperse the nanoparticles and maintain the nanoparticle size of the nanoparticles in the resin composition, therefore losing the properties as nanoparticles. The dispersion of nanoparticles inside the resin material has a great relationship with the enhanced properties of the resin material. The better the dispersion of the nanoparticles, the better the effect of the enhancement. If the dispersion of the nanoparticles is poor, it not only does not improve the effect but may reduce the properties of the resin materials. For example, poor dispersion of the nanoparticles inside the resin materials forms aggregation as defects, resulting in more stress on that defect area and therefore decreasing strength, such as bending strength.

Many of the current methods of dispersing the nanoparticles are to dissolve the resin composition with a solvent and then disperse it with an ultrasonic dispersion machine. After that, the solvent is removed but may remain some in the final resin composition. The remained solvent results in hole defects in the high-performance composites, which reduces the performance. Stirring with a high-speed mixer alone cannot fully disperse the nanoparticles, and the problem of nanoparticle aggregation in the resin formulation persists.

SUMMARY

According to various embodiments of the present disclosure, a method of manufacturing resin composition is provided. The method includes stirring and mixing a nanoparticle filler, a micro-inorganic particle, and a resin to form a mixture; centrifuging the mixture at a high speed to form an upper layer mixing liquid and a lower layer mixing liquid; and taking out the upper layer mixing liquid to obtain the resin composition.

According to some embodiments of the present disclosure, the nano-particle filler includes nano-silicon dioxide, nano-silver, nano-calcium carbonate, nano-kaolin, nano-titanium dioxide, nano-carbon fiber, or combinations thereof.

According to some embodiments of the present disclosure, the nano-particle filler has a particle size of about 5 nm to 250 nm.

According to some embodiments of the present disclosure, the nano-particle filler has a particle size of about 20 nm to 135 nm.

According to some embodiments of the present disclosure, the nano-particle filler has a weight percentage of about 0.1% to 10%.

According to some embodiments of the present disclosure, the nano-particle filler has a weight percentage of about 1% to 9%.

According to some embodiments of the present disclosure, the micro-inorganic particle includes zirconium dioxide, titanium dioxide, micron glass bead, or combinations thereof.

According to some embodiments of the present disclosure, the micro-inorganic particle has a particle size of about 2 μm to 200 μm.

According to some embodiments of the present disclosure, the micro-inorganic particle has a particle size of about 3 μm to 110 μm.

According to some embodiments of the present disclosure, the micro-inorganic particle has a weight percentage of about 0.1% to 30%.

According to some embodiments of the present disclosure, the micro-inorganic particle has a weight percentage of about 5% to 25%.

According to some embodiments of the present disclosure, the resin includes phenol formaldehyde resin, urea-formaldehyde, melamine resin, epoxy, vinyl ester resin, unsaturated polyester resin, polyurethane resin, silicone resin, acrylic resin, or combinations thereof.

According to some embodiments of the present disclosure, the stirring and mixing includes stirring for about 0.5 hours to 15 hours at a temperature of about 20° C. to 160° C. and a stirring speed of about 100 rpm to 5000 rpm.

According to some embodiments of the present disclosure, the stirring and mixing includes stirring for about 0.1 hours to 2 hours at a vacuum of about 0.01 Torr to 100 Torr and a stirring speed of about 50 rpm to 5000 rpm.

According to some embodiments of the present disclosure, centrifuging the mixture at a high speed includes centrifuging for 0.1 hours to 5 hours at a centrifugal speed of about 5000 rpm to 150000 rpm.

BRIEF DESCRIPTION OF THE DRAWINGS

When reading the accompanying figures, the detailed description below provides a fully understanding of the various aspects of this disclosure.

The FIGURE is a flowchart of a method of manufacturing a resin composition according to some embodiments of the present disclosure.

DETAILED DESCRIPTION

A plurality of embodiments of the present disclosure will be disclosed in the figures below. To clarify the illustration, many practical details will be described in the following description. However, it is noted that these practical details should not be used to limit the present disclosure.

Although a series of operations or steps are used hereinafter to illustrate the method disclosed herein, the order shown in these operations or steps should not be explained as limitations to the present disclosure. For example, certain operations or steps may be performed in different orders and/or performed simultaneously with other steps. Further, not all the operations, steps and/or features in the figures should be performed to achieve the embodiments of the present disclosure. Besides, each operation or step described herein may contain several sub-steps or actions.

The FIGURE is a flowchart of a method of manufacturing a resin composition according to various embodiments of the present disclosure. As shown in the FIGURE, a method 100 includes an operation 110, an operation 120, and an operation 130.

Referring to the FIGURE. The operation 110 of the method 100 is stirring and mixing a nano-particle filler, a micro-inorganic particle, and a resin to form a mixture. In some embodiments, stirring and mixing the nano-particle filler, the micro-inorganic particle, and the resin includes adding the nano-particle filler, the micro-inorganic particle, and the resin into a high-speed mixer. For example, the high-speed mixer is a planetary mixer.

In some embodiments, the nano-particle filler includes nano-silicon dioxide, nano-silver, nano-calcium carbonate, nano-kaolin, nano-titanium dioxide, nano-carbon fiber, or combinations thereof. In some embodiments, the nano-particle filler has a particle size of about 5 nm to 250 nm. The nano-particle filler with the particle size in this range can effectively enhance the properties of the resin composition, such as mechanical property, heat resistance, etc. For example, the particle size of the nano-particle filler may be about 10 nm, 20 nm, 30 nm, 50 nm, 70 nm, 100 nm, 115 nm, 135 nm, 155 nm, 175 nm, 195 nm, 200 nm, 210 nm, 220 nm, 230 nm, 240 nm, or 245 nm. In some embodiments, the nano-particle filler has a weight percentage of about 0.1% to 10%. For example, the weight percentage of the nano-particle filler may be about 1%, 3%, 5%, 7%, or 9%. The addition of the nano-particle filler in this weight percentage range enhances the mechanical, electrical, and other properties of the resin composition.

In some embodiments, the micro-inorganic particle includes zirconium dioxide, titanium dioxide, micron glass bead, or combinations thereof. The micro-inorganic particle can be used as a medium to further disperse the nano-particle filler in the resin by the shear and impact forces from the rotation and collision generated by the mechanical external forces. In some embodiments, the micro-inorganic particle has a particle size of about 2 µm to 200 µm. For example, the particle size of the micro-inorganic particle may be about 3 µm, 5 µm, 7 µm, 10 µm, 30 µm, 50 µm, 70 µm, 90 µm, 110 µm, 130 µm, 150 µm, 170 µm, or 190 µm. In detail, the micro-inorganic particle with too large particle size cannot effectively collide, shear, and disperse the nano-particle filler. The micro-inorganic particle that is too small is less likely to be separated from the mixture (including the resin and the nano-particle filler) in subsequent processes. In some embodiments, the micro-inorganic particle has a weight percentage of about 0.1% to 30%. For example, the weight percentage of the micro-inorganic particle may be about 0.5%, 1%, 5%, 10%, 15%, 20%, or 25%. Using a too large amount of the micro-inorganic particle will not be easy to remove an upper layer mixing liquid in the subsequent centrifugal operation. Using a too small amount of the micro-inorganic particle will not be able to produce enough collision and shear forces for dispersing the nanoparticles effectively and takes a longer time.

In some embodiments, the resin may be a thermosetting resin. In some embodiments, the resin includes phenol formaldehyde resin, urea-formaldehyde, melamine resin, epoxy, vinyl ester resin, unsaturated polyester resin, polyurethane resin, silicone resin, acrylic resin, or combinations thereof. In some embodiments, other additives may also be added to the resin, such as a curing agent, an accelerator, etc.

In some embodiments, after adding the nano-particle filler, the micro-inorganic particle, and the resin into the high-speed mixer, stir and mix them for about 0.5 hours to 15 hours at a temperature of about 20° C. to 160° C. and a stirring speed of about 100 rpm to 5000 rpm. For example, the stirring temperature may be about 25° C., 30° C., 50° C., 70° C., 90° C., 100° C., 120° C., or 140° C. In some embodiments, stirring the nano-particle filler, the micro-inorganic particle, and the resin with heat (e.g., heated to 130° C.) enhances the fluidity. In other embodiments, the resin with a good fluidity, such as a low molecular weight liquid epoxy, epoxy solvent solution formulation, aqueous modified polyurethane resin aqueous solution formulation, a vinyl ester resin having a reactive diluent, an unsaturated polyester resin having a reactive diluent etc., after mixing with the nano-particle filler and the micro-inorganic particle, it is not necessary to heat up because of the obvious fluidity observed by the naked eye after mixing.

In some embodiments, after the above-described stirring and mixing, stir and vacuum for about 0.1 hours to 2 hours at a vacuum of about 0.01 Torr to 100 Torr and a stirring speed of about 50 rpm to 5000 rpm to form the mixture. In some embodiments, the temperature at the time of vacuum may be maintained or less than the temperature of the previous stirring and mixing (i.e., 20° C. to 160° C.).

Continuing with referring to the FIGURE. The operation 120 of the method 100 is centrifuging the mixing at a high speed to form an upper layer mixing liquid and a lower layer mixing liquid. In some embodiments, centrifuging the mixture at the high speed includes centrifuging for 0.1 hours to 5 hours at a centrifugal speed of about 5000 rpm to 150000 rpm. Specifically, after centrifuging the mixture formed in the operation 110 at the high speed, the micro-inorganic particle may be centrifuged to a lower layer of a container, and the nano-particle filler is in an upper layer of the container. In other words, the lower layer mixing liquid contains the micro-inorganic particle, and the upper layer mixing liquid contains the nano-particle filler.

Referring to the FIGURE. The operation 130 of the method 100 is taking out the upper layer mixing liquid to obtain the resin composition. By mixing and dispersing as described in the above operations, the nano-particle filler is fully uniformly dispersed in the resin. In other words, the resin composition contains a uniformly dispersed nano-particle filler. This resin composition can further form a composite material in subsequent processes (e.g., curing). The composite with the nanoparticles uniformly dispersed inside can reduce stress on the defects caused by the undispersed nano-particle filler and stomata in the composite material. Therefore, the properties of the composite material enhance, e.g., electrical properties and mechanical properties, and so on.

The following embodiments elaborate on the particular aspect of the present disclosure. Thus, one skilled in the art may implement the present disclosure. However, the following embodiments should not be used as limitation to the present disclosure.

Embodiment 1

A particle of nano-silicon dioxide with an average particle size of about 20 nm, a particle of micro-sized zirconium dioxide with an average particle size of about 3 μm, and a liquid epoxy were added to a planetary mixer. A particle dispersed epoxy mixture liquid was obtained by homogeneous stirring and mixing with a revolution of 1200 rpm, a rotation of 1080 rpm, a temperature of 120° C., and a vacuum of about 0.5 Torr for 1 hour. A weight percentage of the particle of nano-silicon dioxide was 4%. A weight percentage of the particle of micro-sized zirconium dioxide was 10%.

The above-mentioned epoxy mixture liquid with low viscosity was transferred into a centrifuge for centrifuging at a high speed. A centrifugal speed was 80000 rpm. A centrifugal time was 10 minutes. The obtained upper layer was a mixture of the particle of nano-silicon dioxide and the epoxy, which were uniformly dispersed. The obtained lower layer was the particle of micro-sized zirconium dioxide after centrifuging.

The above-mentioned upper layer mixing liquid was taken out to obtain a resin composition with evenly dispersed epoxy and the particle of nano-silicon dioxide.

Embodiment 2

A particle of nano-silver with an average particle size of about 75 nm, a particle of micro-sized titanium dioxide with an average particle size of about 5 μm, and a liquid epoxy were added to a planetary mixer for homogeneous stirring and mixing to obtain a particle dispersed epoxy mixture liquid. A weight percentage of the particle of nano-silve was 3%. A weight percentage of the particle micro-sized titanium dioxide was 15%. The stirring and mixing time was 1 hour with a stirring temperature of about 120° C., a vacuum of about 0.5 Torr, a revolution of about 1500 rpm, and a rotation of about 1350 rpm.

The above-mentioned epoxy mixture liquid with low viscosity was transferred into a centrifuge for centrifuging at a high speed. A centrifugal speed was 70000 rpm. A centrifugal time was 10 minutes. The obtained upper layer was a mixture of the particle of nano-silver and the epoxy, which were uniformly dispersed. The lower layer was the particle of micro-sized titanium dioxide after centrifuging.

The above-mentioned upper layer mixing liquid was taken out to obtain a resin composition with evenly dispersed epoxy and the particle of nano-silver.

Embodiment 3

A particle of nano-silicon dioxide with an average particle size of about 20 nm, a particle of micro-sized zirconium dioxide with an average particle size of about 3 μm, and a liquid epoxy were added to a planetary mixer for homogeneous stirring and mixing to obtain a particle dispersed epoxy mixture liquid. A weight percentage of the particle of nano-silicon dioxide was 4%. A weight percentage of the particle of micro-sized zirconium dioxide was 20%. The stirring and mixing time was 1 hour with a stirring temperature of about 120° C., a vacuum of about 0.5 Torr, a revolution of about 1200 rpm, and a rotation of about 1080 rpm.

The above-mentioned epoxy mixture liquid with low viscosity was transferred into a centrifuge for centrifuging at a high speed. A centrifugal speed was 80000 rpm. A centrifugal time was 10 minutes. The obtained upper layer was a mixture of the particle of nano-silicon dioxide and the epoxy, which were uniformly dispersed. The lower layer was the particle of micro-sized zirconium dioxide after centrifuging.

The above-mentioned upper layer mixing liquid was taken out to obtain a resin composition with evenly dispersed epoxy and the particle of nano-silicon dioxide.

Embodiment 4

A particle of nano-silver with an average particle size of about 75 nm, a particle of micro-sized titanium dioxide with an average particle size of about 5 μm, and a liquid epoxy were added to a planetary mixer for homogeneous stirring and mixing to obtain a particle dispersed epoxy mixture liquid. A weight percentage of the particle of nano-silve was 3%. A weight percentage of the particle micro-sized titanium dioxide was 25%. The stirring and mixing time was 1 hour with a stirring temperature of about 120° C., a vacuum of about 0.5 Torr, a revolution of about 1500 rpm, and a rotation of about 1350 rpm.

The above-mentioned epoxy mixture liquid with low viscosity was transferred into a centrifuge for centrifuging at a high speed. A centrifugal speed was 70000 rpm. A centrifugal time was 10 minutes. The obtained upper layer was a mixture of the particle of nano-silver and the epoxy, which were uniformly dispersed. The lower layer was the particle of micro-sized titanium dioxide after centrifuging.

The above-mentioned upper layer mixing liquid was taken out to obtain a resin composition with evenly dispersed epoxy and the particle of nano-silver.

Embodiment 5

A particle of nano-silicon dioxide with an average particle size of about 20 nm, a particle of micro-sized zirconium dioxide with an average particle size of about 3 μm, and a liquid epoxy were added to a planetary mixer for homogeneous stirring and mixing to obtain a particle dispersed epoxy mixture liquid. A weight percentage of the particle of nano-silicon dioxide was 1%. A weight percentage of the particle of micro-sized zirconium dioxide was 20%. The stirring and mixing time was 1 hour with a stirring temperature of about 120° C., a vacuum of about 0.5 Torr, a revolution of about 1200 rpm, and a rotation of about 1080 rpm.

The above-mentioned epoxy mixture liquid with low viscosity was transferred into a centrifuge for centrifuging at a high speed. A centrifugal speed was 80000 rpm. A centrifugal time was 10 minutes. The obtained upper layer was a mixture of the particle of nano-silicon dioxide and the epoxy, which were uniformly dispersed. The lower layer was the particle of micro-sized zirconium dioxide after centrifuging.

The above-mentioned upper layer mixing liquid was taken out to obtain a resin composition with evenly dispersed epoxy and the particle of nano-silicon dioxide.

Embodiment 6

A particle of nano-silicon dioxide with an average particle size of about 20 nm, a particle of micro-sized zirconium dioxide with an average particle size of about 3 μm, and a liquid epoxy were added to a planetary mixer for homogeneous stirring and mixing to obtain a particle dispersed epoxy mixture liquid. A weight percentage of the particle of nano-silicon dioxide was 8%. A weight percentage of the particle of micro-sized zirconium dioxide was 20%. The stirring and mixing time was 1 hour with a stirring temperature of about 120° C., a vacuum of about 0.5 Torr, a revolution of about 1200 rpm, and a rotation of about 1080 rpm.

The above-mentioned epoxy mixture liquid with low viscosity was transferred into a centrifuge for centrifuging at a high speed. A centrifugal speed was 80000 rpm. A centrifugal time was 10 minutes. The obtained upper layer was a mixture of the particle of nano-silicon dioxide and the epoxy, which were uniformly dispersed. The lower layer was the particle of micro-sized zirconium dioxide after centrifuging.

The above-mentioned upper layer mixing liquid was taken out to obtain a resin composition with evenly dispersed epoxy and the particle of nano-silicon dioxide.

Embodiment 7

A particle of nano-silicon dioxide with an average particle size of about 130 nm, a particle of micron glass bead with an average particle size of about 100 μm, and a liquid epoxy were added to a planetary mixer for homogeneous stirring and mixing to obtain a particle dispersed epoxy mixture liquid. A weight percentage of the particle of nano-silicon dioxide was 0.5%. A weight percentage of the particle of micron glass bead was 5%. The stirring and mixing time was 1 hour with a stirring temperature of about 120° C., a vacuum of about 0.5 Torr, a revolution of about 1200 rpm, and a rotation of about 1080 rpm.

The above-mentioned epoxy mixture liquid with low viscosity was transferred into a centrifuge for centrifuging at a high speed. A centrifugal speed was 80000 rpm. A centrifugal time was 10 minutes. The obtained upper layer was a mixture of the particle of nano-silicon dioxide and the epoxy, which were uniformly dispersed. The lower layer was the particle of micron glass bead after centrifuging.

The above-mentioned upper layer mixing liquid was taken out to obtain a resin composition with evenly dispersed epoxy and the particle of nano-silicon dioxide.

Comparative Embodiment 1

A particle of nano-silicon dioxide with an average particle size of about 20 nm and a liquid epoxy were added to a planetary mixer for homogeneous stirring and mixing to obtain a particle dispersed epoxy mixture liquid. A weight percentage of the particle of nano-silicon dioxide was 4%. The stirring and mixing time was 1 hour with a stirring temperature of about 120° C., a vacuum of about 0.5 Torr, and a stirring speed of about 1200 rpm.

The above-mentioned particle dispersed epoxy mixture liquid with low viscosity was transferred into a centrifuge for centrifuging at a high speed. A centrifugal speed was 80000 rpm. A centrifugal time was 10 minutes.

The above-mentioned mixing liquid with the epoxy and the particle of nano-silicon dioxide was taken out.

Comparative Embodiment 2

A particle of nano-silver with an average particle size of about 75 nm and a liquid epoxy were added to a planetary mixer for homogeneous stirring and mixing to obtain a particle dispersed epoxy mixture liquid. A weight percentage of the particle of nano-silver was 3%. The stirring and mixing time was 1 hour with a stirring temperature of about 120° C., a vacuum of about 0.5 Torr, and a stirring speed of about 1500 rpm.

The above-mentioned particle dispersed epoxy mixture liquid with low viscosity was transferred into a centrifuge for centrifuging at a high speed. A centrifugal speed was 70000 rpm. A centrifugal time was 10 minutes.

The above-mentioned mixing liquid with the epoxy and the particle of nano-silver was taken out.

Comparative Embodiment 3

A particle of nano-silicon dioxide with an average particle size of about 130 nm and a liquid epoxy were added to a planetary mixer for homogeneous stirring and mixing to obtain a particle dispersed epoxy mixture liquid. A weight percentage of the particle of nano-silicon dioxide was 0.5%. The stirring and mixing time was 1 hour with a stirring temperature of about 120° C., a vacuum of about 0.5 Torr, and a stirring speed of about 1200 rpm.

The above-mentioned particle dispersed epoxy mixture liquid with low viscosity was transferred into a centrifuge for centrifuging at a high speed. A centrifugal speed was 80000 rpm. A centrifugal time was 10 minutes.

The above-mentioned mixing liquid with the epoxy and the particle of nano-silicon dioxide was taken out.

Comparative Embodiment 4

A liquid epoxy was added to a planetary mixer for stirring and then transferred into a centrifuge for centrifuging at a high speed. The stirring time was 1 hour with a stirring temperature of 120° C., a vacuum of about 0.5 Torr, a stirring speed of 1200 rpm, a centrifugal speed of 70000 rpm, and a centrifugal time of 10 minutes.

In the following embodiment, the epoxy equivalent of the epoxy used in Embodiments 1-7 and Comparative Embodiments 1-3 was calculated. The same equivalent of an ether amine curing agent was mixed with the final mixing liquid obtained in Embodiments 1-7 and Comparative Embodiments 1-3 in a mold. Then, the mold was moved to an oven to heat up to 60° C. to solidify for the preparation of a resin nanocomposite plate. After that, the resin nanocomposite plate was cut into a standard test piece of the resin nanocomposite by CNC for various performance tests, including bending strength, bending modulus, dispersion rate, etc. The test results are in Table 1 below.

TABLE 1

|  | Nano-Particle Filler | | Micro-Inorganic Particle | | Bending Strength (MPa) | Bending Modulus (MPa) | Aggregation Size (nm) |
| --- | --- | --- | --- | --- | --- | --- | --- |
|  | Amount (%) | Size (nm) | Amount (%) | Size (μm) | | | |
| Embodiment 1 | 4 | 20 | 10 | 3 | 166.6 | 3599 | <95 |
| Embodiment 2 | 3 | 75 | 15 | 5 | 164.4 | 3485 | <305 |
| Embodiment 3 | 4 | 20 | 20 | 3 | 168.8 | 3626 | <93 |
| Embodiment 4 | 3 | 75 | 25 | 5 | 165.1 | 3497 | <302 |
| Embodiment 5 | 1 | 20 | 20 | 3 | 162.5 | 3218 | <85 |
| Embodiment 6 | 8 | 20 | 20 | 3 | 159.7 | 3582 | <155 |
| Embodiment | 0.5 | 130 | 5 | 100 | 162.3 | 3197 | <268 |

TABLE 1-continued

| | Nano-Particle Filler | | Micro-Inorganic Particle | | Bending Strength (MPa) | Bending Modulus (MPa) | Aggregation Size (nm) |
|---|---|---|---|---|---|---|---|
| | Amount (%) | Size (nm) | Amount (%) | Size (μm) | | | |
| ment 7 | | | | | | | |
| Comparative Embodiment 1 | 4 | 20 | — | — | 152.4 | 3430 | >950 |
| Comparative Embodiment 2 | 3 | 75 | — | — | 154.2 | 3353 | >2200 |
| Comparative Embodiment 3 | 0.5 | 130 | — | — | 148.7 | 3082 | >1900 |
| Comparative Embodiment 4 | — | — | — | — | 151.0 | 3060 | — |

The bending strength in Table 1 was tested according to the specification ASTM D790. The test piece was bent by a three-point bending tool and a maximum yield stress was the strength (MPa). The strength measuring instrument was the German ZwickRoell universal material testing machine.

The bending modulus was tested according to the specification ASTM D790. The test piece was bent by a three-point bending tool and the stress and strain within elastic limit was calculated (MPa). The modulus measuring instrument was the German ZwickRoell universal material testing machine.

The dispersion rate was observed by scanning electron microscope (SEM) and the aggregation size of the nano-particle filler was determined by software. The imaging observation instrument was the Japanese Hitachi FE-SEM.

Please refer to Table 1. Compared with the resin material prepared by Comparative Embodiment 4, the bending strength and the bending modulus of the resin nanocomposite prepared by Embodiment 1 are 10.3% and 17.6% higher. Compared with the resin material prepared by Comparative Embodiment 4, the bending strength and the bending modulus of the resin nanocomposite prepared by Embodiment 2 are 8.9% and 13.9% higher. Compared with the resin material prepared by Comparative Embodiment 4, the bending strength and the bending modulus of the resin nanocomposite prepared by Embodiment 3 are 11.8% and 18.5% higher. Compared with the resin material prepared by Comparative Embodiment 4, the bending strength and the bending modulus of the resin nanocomposite prepared by Embodiment 4 are 9.3% and 14.3% higher. Compared with the resin material prepared by Comparative Embodiment 4, the bending strength and the bending modulus of the resin nanocomposite prepared by Embodiment 5 are 7.6% and 5.2% higher. Compared with the resin material prepared by Comparative Embodiment 4, the bending strength and the bending modulus of the resin nanocomposite prepared by Embodiment 6 are 5.8% and 17.1% higher. Compared with the resin material prepared by Comparative Embodiment 4, the bending strength and the bending modulus of the resin nanocomposite prepared by Embodiment 7 are 7.5% and 4.5% higher.

Compared with the resin material prepared by Comparative Embodiment 1, the bending strength and the bending modulus of the resin nanocomposite prepared by Embodiment 1 are 9.3% and 4.9% higher. Compared with the resin material prepared by Comparative Embodiment 2, the bending strength and the bending modulus of the resin nanocomposite prepared by Embodiment 2 are 6.6% and 3.9% higher.

Besides, according to Table I, the aggregation size of the resin nanocomposite prepared by Embodiments 1 to 7 is significantly smaller than the aggregation size of the resin nanocomposite prepared by Comparative Embodiments 1 to 3.

As described above, according to the embodiments of the present disclosure, a method of manufacturing the resin composition is provided. The method can effectively and evenly disperse the nano-particle filler in the resin, and reduce the stress on the defect caused by the presence of the undispersed nano-particle filler in the composite material after curing. Therefore, the mechanical property and the stability of the resin composition and the composite material can be improved.

Although the present disclosure has been disclosed in the embodiments above, they are not intended to limit the present disclosure. One skilled in the art, without departing from the spirit and scope of the present disclosure, may perform various changes and embellishments. The scope of protection of the present disclosure shall be determined by the scope of the appended patent application.

What is claimed is:

1. A method of manufacturing resin composition, comprising:
   stirring and mixing a nano-particle filler, a micro-inorganic particle, and a resin to form a mixture, wherein the nano-particle filler comprises nano-silicon dioxide, nano-silver, nano-calcium carbonate, nano-kaolin, nano-carbon fiber, or combinations thereof, and the micro-inorganic particle has a weight percentage of about 0.1% to 30%;
   centrifuging the mixture at a high speed to form an upper layer mixing liquid and a lower layer mixing liquid; and
   taking out the upper layer mixing liquid to obtain the resin composition.

2. The method of claim 1, wherein the nano-particle filler has a particle size of about 5 nm to 250 nm.

3. The method of claim 2, wherein the nano-particle filler has a particle size of about 20 nm to 135 nm.

4. The method of claim 1, wherein the nano-particle filler has a weight percentage of about 0.1% to 10%.

5. The method of claim 4, wherein the nano-particle filler has a weight percentage of about 1% to 9%.

6. The method of claim 1, wherein the micro-inorganic particle comprises zirconium dioxide, titanium dioxide, micron glass bead, or combinations thereof.

7. The method of claim 1, wherein the micro-inorganic particle has a particle size of about 2 μm to 200 μm.

8. The method of claim 7, wherein the micro-inorganic particle has a particle size of about 3 μm to 110 μm.

9. The method of claim 1, wherein the micro-inorganic particle has a weight percentage of about 5% to 25%.

10. The method of claim 1, wherein the resin comprises phenol formaldehyde resin, urea-formaldehyde, melamine resin, epoxy, vinyl ester resin, unsaturated polyester resin, polyurethane resin, silicone resin, acrylic resin, or combinations thereof.

11. The method of claim 1, wherein the stirring and mixing comprises stirring for about 0.5 hours to 15 hours at a first temperature of about 20° C. to 160° C. and a stirring speed of about 100 rpm to 5000 rpm.

12. The method of claim 11, wherein the stirring and mixing further comprises stirring for about 0.1 hours to 2 hours at a second temperature lower than the first temperature, a vacuum of about 0.01 Torr to 100 Torr and a stirring speed of about 50 rpm to 5000 rpm.

13. The method of claim 11, wherein the first temperature is 70° C. to 160° C.

14. The method of claim 11, wherein the first temperature is 90° C. to 160° C.

15. The method of claim 1, wherein centrifuging the mixture at a high speed comprises centrifuging for 0.1 hours to 5 hours at a centrifugal speed of about 5000 rpm to 150000 rpm.

16. The method of claim 1, wherein the resin comprises phenol formaldehyde resin, urea-formaldehyde, melamine resin, epoxy, vinyl ester resin, unsaturated polyester resin, polyurethane resin, silicone resin, or combinations thereof.

17. The method of claim 1, wherein the resin further comprises a curing agent.

* * * * *